(12) United States Patent
McKibben et al.

(10) Patent No.: US 6,502,672 B1
(45) Date of Patent: Jan. 7, 2003

(54) BRAKE FOR A ROTARY TURNTABLE

(75) Inventors: Kenneth D. McKibben, Defiance, OH (US); Daniel D. Minor, Cadillac, MI (US); William W. Seaton, Dexter, MI (US); Alan P. Gould, Tawas City, MI (US); Robert L. Macheske, Tawas City, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 0 days.

(21) Appl. No.: 09/751,306

(22) Filed: Dec. 28, 2000

(51) Int. Cl.$^7$ ............................................... F16D 51/00
(52) U.S. Cl. .................. 188/77 W; 188/77 R
(58) Field of Search ............................... 188/77 R, 77 W

(56) References Cited

U.S. PATENT DOCUMENTS

| | | | | |
|---|---|---|---|---|
| 1,526,121 A | * | 2/1925 | Crowley | 188/77 W |
| 2,302,521 A | * | 11/1942 | Bjorge | 188/77 W |
| 2,678,703 A | * | 5/1954 | Williams et al. | 188/77 R |
| 2,682,934 A | * | 7/1954 | Howarth | 188/77 R |
| 2,701,630 A | * | 2/1955 | Horton et al. | 188/77 R |
| 3,031,039 A | * | 4/1962 | Goodwin | 188/77 R |
| 4,044,533 A | * | 8/1977 | Wick | 188/77 W |
| 4,604,914 A | * | 8/1986 | Fisher | 188/77 R |
| 5,131,509 A | * | 7/1992 | Moon et al. | 188/77 R |
| 6,029,785 A | * | 2/2000 | Koivunen | 188/75 |

* cited by examiner

Primary Examiner—Jack Lavinder
Assistant Examiner—Robert A. Siconolfi
(74) Attorney, Agent, or Firm—MacMillan, Sobanski & Todd, LLC

(57) ABSTRACT

This invention relates to a brake system adapted for use with a rotary turntable. The brake system includes a braking member secured to the rotary turntable, at least one brake band, and an actuator operatively connected to the brake band for selectively moving the brake band between a braking position and a non-braking position. The braking member has a generally annular shape and includes a generally annular outer braking surface. The brake band has a generally annular shape and includes a generally annular outer friction surface disposed adjacent the annular outer braking surface of the braking member. The brake band is movable between a first non-braking position, wherein the friction surface of the brake band is spaced apart from the braking surface of the braking member, and a second braking position, wherein the friction surface of the brake band contacts at least a portion of the braking surface of the braking member. The brake band includes a first end and an opposite second end. The first end of the brake band is secured to a stationary anchor member. The actuator is operatively connected to the second end of the brake band for selectively moving the brake band between the braking position and the non-braking position.

18 Claims, 4 Drawing Sheets

BRAKE FOR A ROTARY TURNTABLE

BACKGROUND OF THE INVENTION

This invention relates in general to stopping the rotation of a rotary turntable and in particular to an improved brake for stopping the rotation of such a rotary turntable.

A rotary table is a commonly used device in manufacturing. The rotary table can be used to reduce labor costs by allowing a number of mobile machines to be delivered, one a time, to a stationary machine. Once the table stops rotating, a worker can perform a manufacturing step which employs the mobile machine and the stationary machine.

A rotary table can be used in the manufacturing of cast articles, such as for example. an automobile wheel. When the rotary table is so used, it supports and moves a series of mobile casting apparatuses used to manufacture the automobile wheel until a first casting apparatus is aligned with a stationary furnace. Once the first casting apparatus and the furnace are aligned, the furnace delivers a supply of a molten metal to the first casting apparatus. An operator is can also be involved in the delivery of the molten metal to the first casting apparatus. The molten metal in the first casting apparatus is transformed into a first automobile wheel.

The rotary table rotates to move the first casting apparatus away from the furnace and moves a second casting apparatus on the table until the second casting apparatus is aligned with the furnace. The furnace delivers a supply of a molten metal to the second casting apparatus. The operator mentioned above can also be involved in the delivery of the molten metal to the second casting apparatus. The molten metal in the second casting apparatus is transformed into a second automobile wheel. The process of moving and aligning the casting apparatuses is repeated as desired, allowing for the operator to sequentially be involved in the delivery of the molten metal to each subsequent casting apparatus.

Typically, the series of casting apparatuses on the rotary table are very heavy. Since the rotary table must align each casting apparatus with the furnace, the rotary table must have some means for slowing and stopping its rotation. while bearing a heavy load, quickly and accurately. It should be understood that the rotary table can also be used in conjunction with other equipment and processes positioned proximate the perimeter of the rotary table, such as unloaders, cleaners, and the like. Thus, it would thus be desirable to provide a system to slow and stop the rotation of a rotary table quickly and accurately which was simple and economical.

SUMMARY OF THE INVENTION

This invention relates to a brake system adapted for use with a rotary turntable. The brake system includes a braking member secured to the rotary turntable, at least one brake band, and an actuator operatively connected to the brake band for selectively moving the brake band between a braking position and a non-braking position. The braking member has a generally annular shape and includes a generally annular outer braking surface. The brake band has a generally annular shape and includes a generally annular outer friction surface disposed adjacent the annular outer braking surface of the braking member. The brake band is movable between a first non-braking position, wherein the friction surface of the brake band is spaced apart from the braking surface of the braking member, and a second braking position, wherein the friction surface of the brake band contacts at least a portion of the braking surface of the braking member. The brake band includes a first end and an opposite second end. The first end of the brake band is secured to a stationary anchor member. The actuator is operatively connected to the second end of the brake band for selectively moving the brake band between the braking position and the non-braking position.

Other advantages of this invention will become apparent to those skilled in the art from the following detailed description of the preferred embodiment. when read in light of the accompanying drawings.

DETAILED DESCRIPTION OF THE PREFERRED EMBODIMENT

Figure 1:
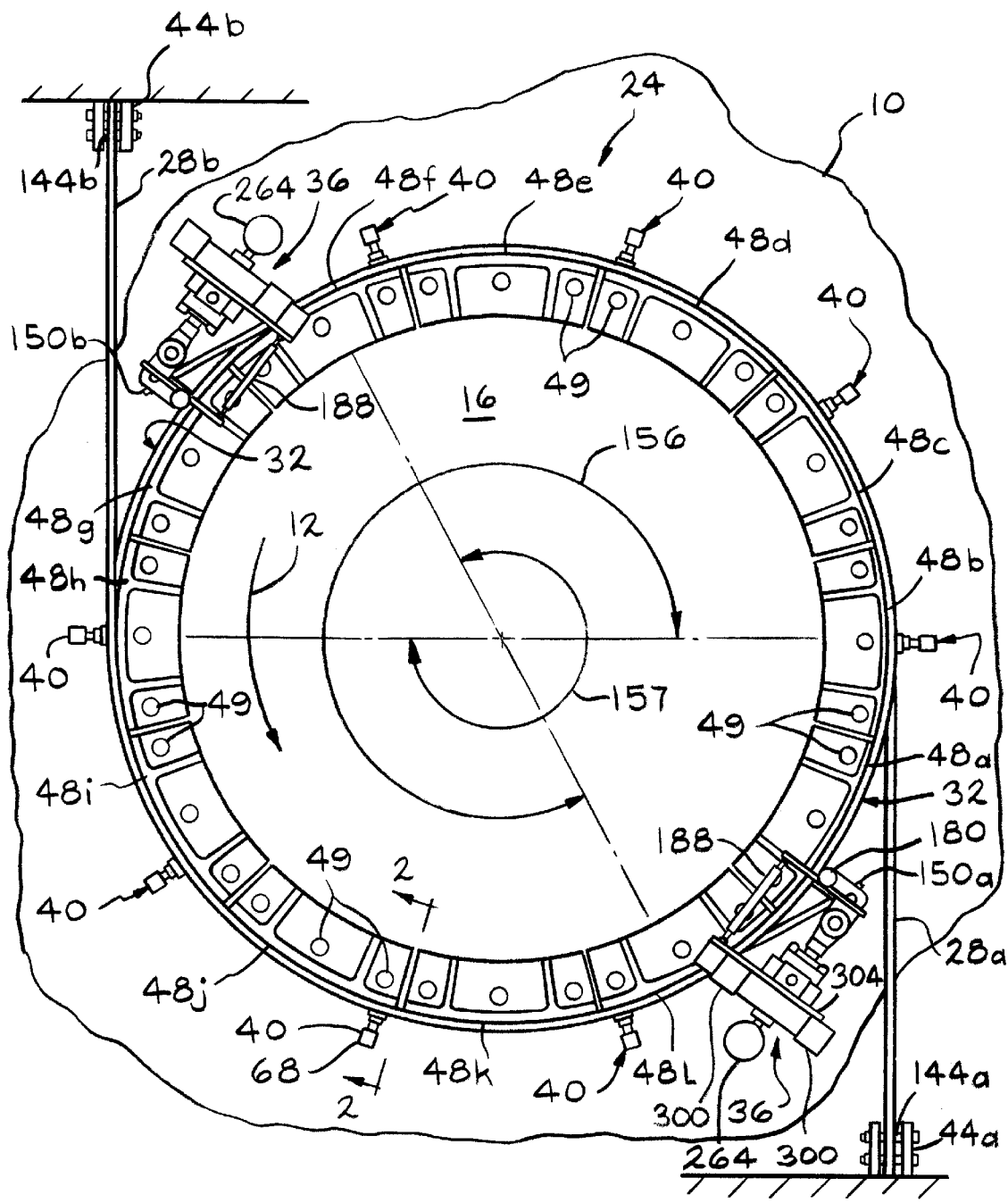
FIG. 1 is a bottom plan view of a rotary table including a braking system according to the invention.

Referring now to FIGS. 1 through 4, there is illustrated a rotary turntable 10 including a braking system, indicated generally at 24, in accordance with the present invention. Although this invention will be described and illustrated in conjunction with the particular rotary turntable 10 disclosed herein, it will be appreciated that this invention can be used in conjunction with other rotary turntables. The general structure and operation of the rotary turntable 10 is conventional in the art. Thus, only those portions of the rotary turntable 10 which are necessary for a full understanding of this invention will be explained and illustrated in detail.

The illustrated rotary turntable 10 is adapted to rotate in a counter clockwise direction as indicated by arrow 12. The turntable 10 is a rotary member and includes a bottom surface 16 and a top surface 20, shown in FIG. 2. The bottom surface 16 and the top surface 20 are generally flat spaced apart surfaces and are generally parallel to each other. Alternatively, the construction of the turntable 10 can be other than illustrated if desired.

The brake system 24 of the present invention is provided to stop the turntable 10 from rotating in a way as described herein. As used herein, the word "stop" is understood to include causing the turntable 10 to decelerate by slowing down the rotation thereof or to decelerate by completely stopping the rotation thereof, as desired.

Figure 2:
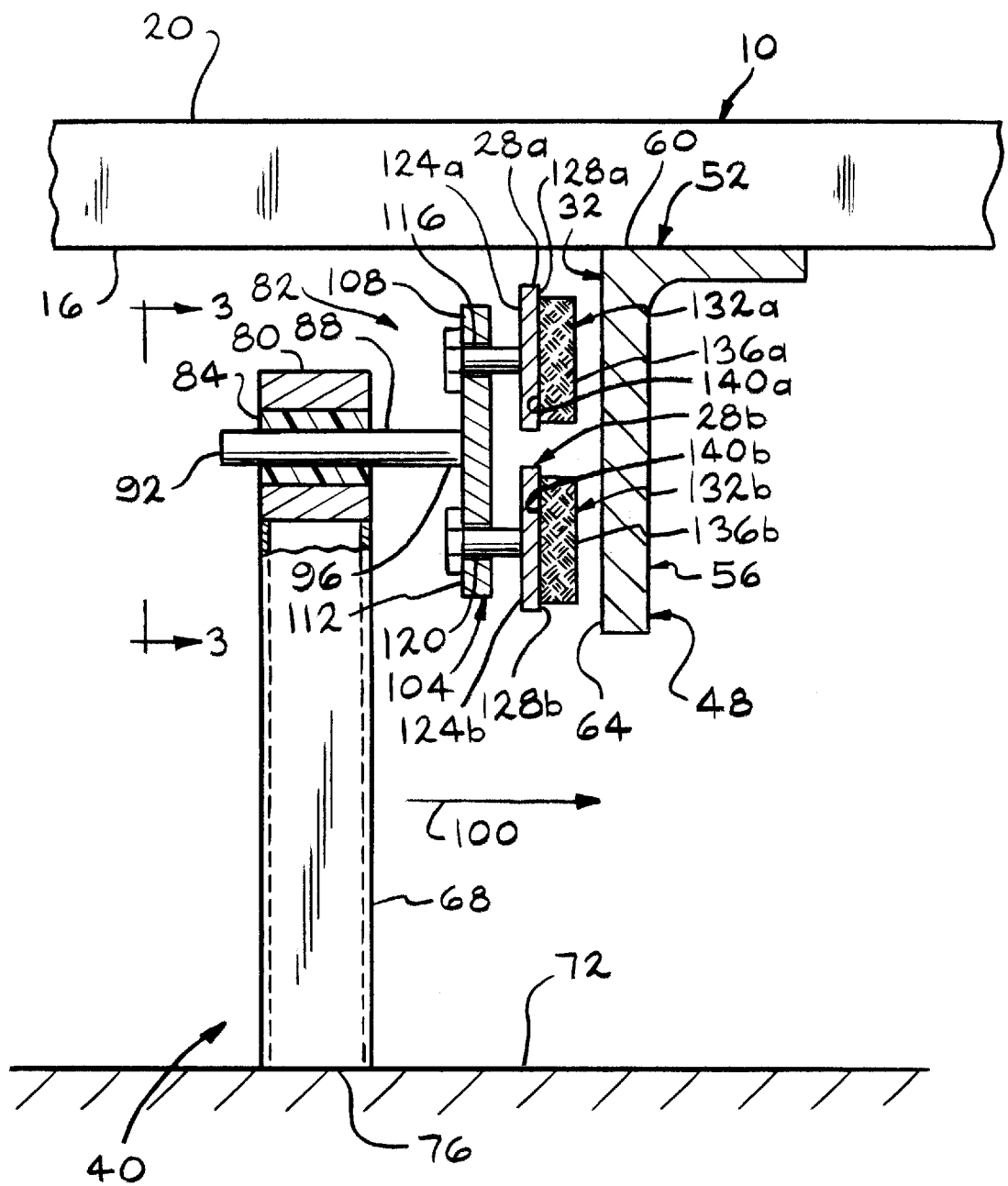
FIG. 2 is a cross-sectional elevational view of a portion of the braking system taken along line 2—2 of FIG. 1.
Figure 3:
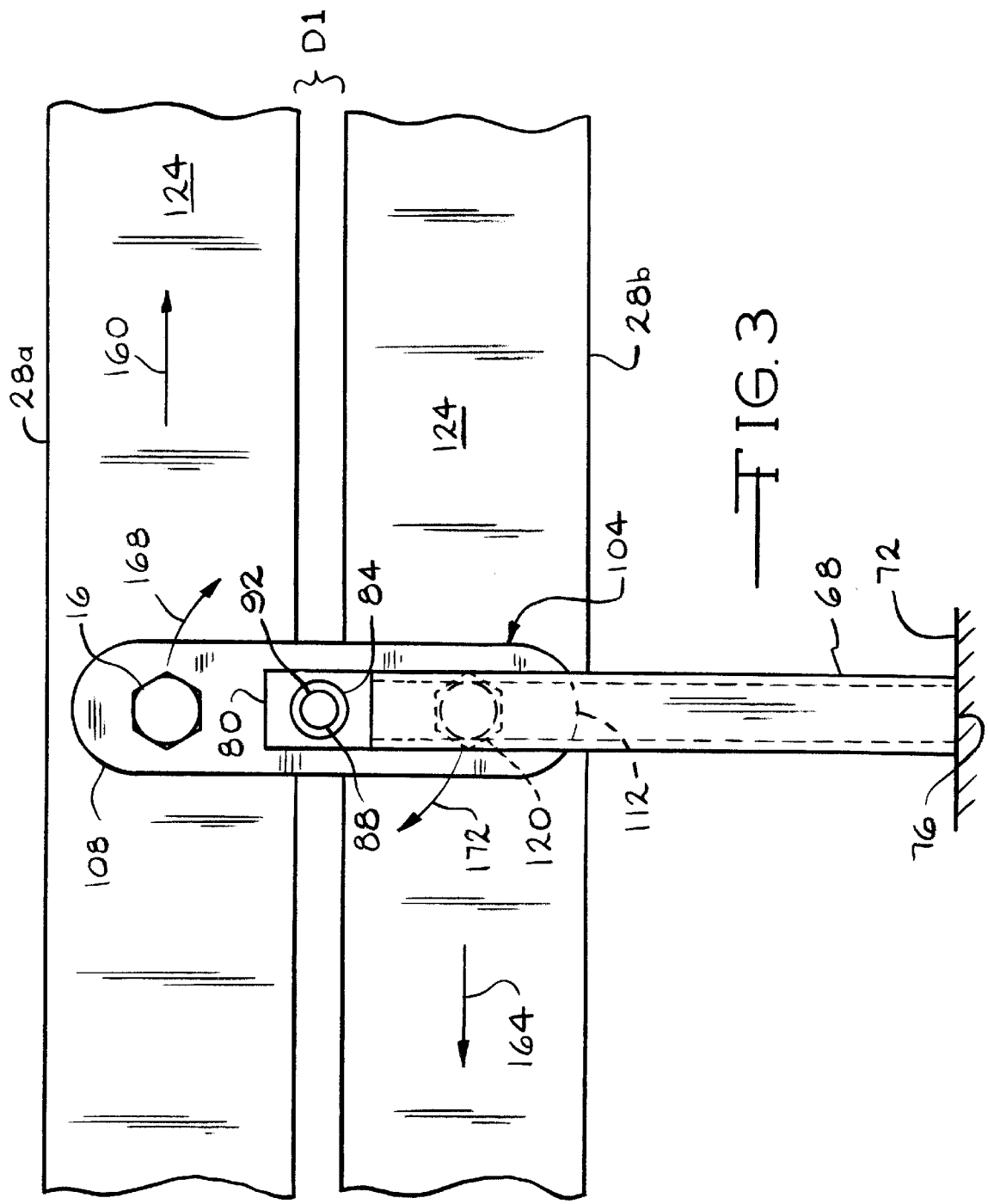
FIG. 3 is an elevational view of a portion of the braking system taken along line 3—3 of FIG. 2.

The illustrated brake system 24 includes a pair of spaced apart brake member or bands 28a and 28b, shown in FIGS. 2 and 3, which are provided to stop the rotation of the turntable 10. The brake band 28a defines an upper brake band, and the brake band 28b defines a lower brake band 28b.

The illustrated brake system 24 further includes a rotary braking member or brake drum 32 which is engaged by the upper brake band 28a and the lower brake band 28b as described herein, eight band supports 40, two actuators 36, and two anchors 44a, 44a. The band supports 40 are operative to position the upper brake band 28a and the lower brake band 28b in a desired position relative to the brake drum 32. The two actuators 36 are operative to move the upper brake band 28a and the lower brake band 28b into contact with a portion of the brake drum 32. The two anchors 44a and 44b are operative to secure the upper brake band 28a and the lower brake band 28b at a desired fixed point. Alternatively, the number and structure of one or more of the brake bands 28a and 28b, the supports 40, the actuators 36, and the anchors 44a and 44b can be other than illustrated if desired.

The upper brake band 28a includes a first anchored end 144a and a second opposite control end 150a. The control end 150a of the upper brake band 28a is operatively connected to the actuator 36 in any suitable manner and is spaced apart from the brake drum 32. The anchored end 144a of the upper brake band 28a is fixed to the anchor 44a in any suitable manner.

The illustrated upper brake band 28a is positioned with respect to the brake drum 32 (best seen in FIG. 2) of the brake system 24 so as to provide an amount of contact surface (illustrated by the arrow 156) with the brake drum 32 during stopping. In the illustrated embodiment, the contact surface 156 of the upper brake band 28a with the brake drum 32 extends from about the band support 40 nearest to the anchored end 144a of the upper brake band 28a to about the location of the actuator 36 which supports the upper brake band 28a. It should be understood that the upper brake band 28a preferably includes a brake pad 132a which contacts the brake drum 32 during braking as described herein. The illustrated brake pad 132a provides about 300 degrees of contact surface with the brake drum 32 as illustrated by the arrow 156. It should be understood that the brake pad 132a may provide any suitable amount of contact surface area with the brake drum 32. Likewise, the upper brake band 28a itself may provide the contact surface with the brake drum 32.

Referring now to FIG. 2, the illustrated upper brake band 28a includes an outer surface 124a and an inner surface 128a. The upper brake band 28a is preferably made from a suitable material, such as steel, through any other suitable material may be used. The outer surface 124a and the inner surface 128a are generally about parallel to each other. The upper brake band 28a is operatively connected to the brake pad 132a. The brake pad 132a has an inner surface 136a and an outer surface 140a. The inner surface 136a of the brake pad 132a is spaced apart from the brake drum 32 when a braking assembly 82 of the brake system 24 is in the non-braking position. The outer surface 140a of the brake pad 132a is preferably secured to the inner surface 128a of the upper brake band 28a by a suitable method, such as bonding or riveting The lower brake band 28b includes a first anchored end 144b and a second opposite control end 150b. The control end 150b of the lower brake band 28b illustrated is operatively connected to the actuator 36 in any suitable manner and is spaced apart from the brake drum 32. The anchored end 144b of the lower brake band 28b is fixed to the anchor 44b in any suitable manner.

The illustrated lower brake band 28b is positioned with respect to the brake drum 32 (best seen in FIG. 2) of the brake system 24 so as to provide an amount of contact surface (indicated by arrow 157) with the brake drum 32 during stopping. The arrow 157 extends from about the band support 40 nearest to the anchored end 144b of the lower brake band 28b to about the location of the actuator 36 which supports the lower brake band 28b. It should be understood that the lower brake band 28b preferably supports a brake pad 132b to contact the brake drum 32 during braking as described herein. The illustrated brake pad 132b provides about 300 degrees of contact surface with the brake drum 32 as illustrated by the arrow 157. It should be understood that the brake pad 132b may provide any suitable amount of contact surface with the brake drum 32. Likewise, the lower brake band 28b itself may provide the contact surface with the brake drum 32.

Referring now to FIG. 2, the illustrated lower brake band 28b includes an outer surface 124b and an inner surface 128b. The lower brake band 28b is preferably made from a suitable material, such as steel, through any suitable material may be used. The outer surface 124b and the inner surface 128b are generally about parallel to each other. The lower brake band 28b is operatively connected to the brake pad 132a. The brake pad 132b has an inner surface 136b and an outer surface 140b. The inner surface 136b of the brake pad 132b is space apart from the brake drum 32 when the braking assembly 82 is in the non-braking position. The outer surface 140b of the brake pad 132b is preferably secured to the inner surface 128b of the lower brake band 28b by a suitable method, such as by bonding or riveting.

The illustrated brake drum 32 is formed by a plurality of individual segments 48a –48l(best seen in FIG. 2) positioned next to each other to form a generally circular configuration. The illustrated brake drum 32 includes twelve segments 48a –48l. Any suitable number of the segments may be employed for the brake drum 32. The brake drum 32 may also be a single integral structure. The illustrated segments 48a –48l have a generally L-shaped cross-section. The segments 48a –48l include an outer surface 52 and an inner surface 56. The outer surface 52 includes a first surface 60 and a second surface 64. The first surface 60 defines a mounting surface and is secured to the bottom surface 16 of the turntable 10 by one or more fasteners 49 so as to secure the segments 48a –48l to the turntable 10. Such fasteners 49 can include bolts, rivets, screws, or any other suitable fastening means. The second surface 64 is disposed adjacent to the brake bands 28a and 28b for a purpose described herein. The segments 48a –48l are positioned directly adjacent to each other such that the second surfaces 64 of each of the segments 48a –48l cooperate to form a generally continuous annular braking surface. Alternatively, the number, profile and/or positioning of the segments 48a –48l can be other than illustrated. For example, the opposing ends of the segments 48a –48l can be positioned next to each other in an abutting relationship.

Referring now to FIG. 2, the illustrated band support 40 includes a post 68 having a lower end 76 fixed to a floor surface 72 by suitable means. Although the illustrated brake system 24 includes eight band supports 40 any suitable number, including one, may be employed. The band supports 40 are preferably about equally spaced apart from each other around the perimeter of the turntable 10 as disclosed herein, though may be used in any suitable configuration. The band support 40 is operative to support the brake bands 28a, 28b at a predetermined distance relative to the floor surface 72 and the turntable 10 as well at to support movement of the brake bands 28a, 28b as described herein The post 68 is preferably a hollow member having a generally square cross-section and includes the lower end 76 and an upper end 80. The upper end 80 of the post 68 supports a braking assembly, indicated generally at 82. The braking assembly 82 is illustrated is in a non-braking or unactuated position. The upper end 80 of the post 68 also supports a suitable bearing 84. The bearing 84 is preferably a low friction structure which slidably supports a guide rod 88 having an outer end 92 and an inner end 96. The guide rod 88 is illustrated as being a cylinder. The bearing 84 permits the guide rod 88 to move in the direction indicated by the arrow 100, so as facilitate movement of the brake bands 28a, 28b relative to the brake drum 32. The inner end 96 of the guide rod 88 is operatively connected to a support plate 104.

Referring now to FIG. 3, in the embodiment illustrated, the inner end 96 of the guide rod 88 is secured to a support plate 104. The support plate 104 illustrated is a narrow plate having an upper rounded end 108 and a lower rounded end 112. The support plate 104 need not be rounded.

The upper end 108 of the support plate 104 includes an aperture for receiving an upper connector or fastener disposed 116. The connector 116 is operative to connect the upper brake band 28a to the support plate 104. The lower end 112 of the support plate 104 includes an aperture for receiving a lower connector or fastener 120. The connector 120 is operative to connect the lower brake band 28b to the support plate 104.

Figure 4:
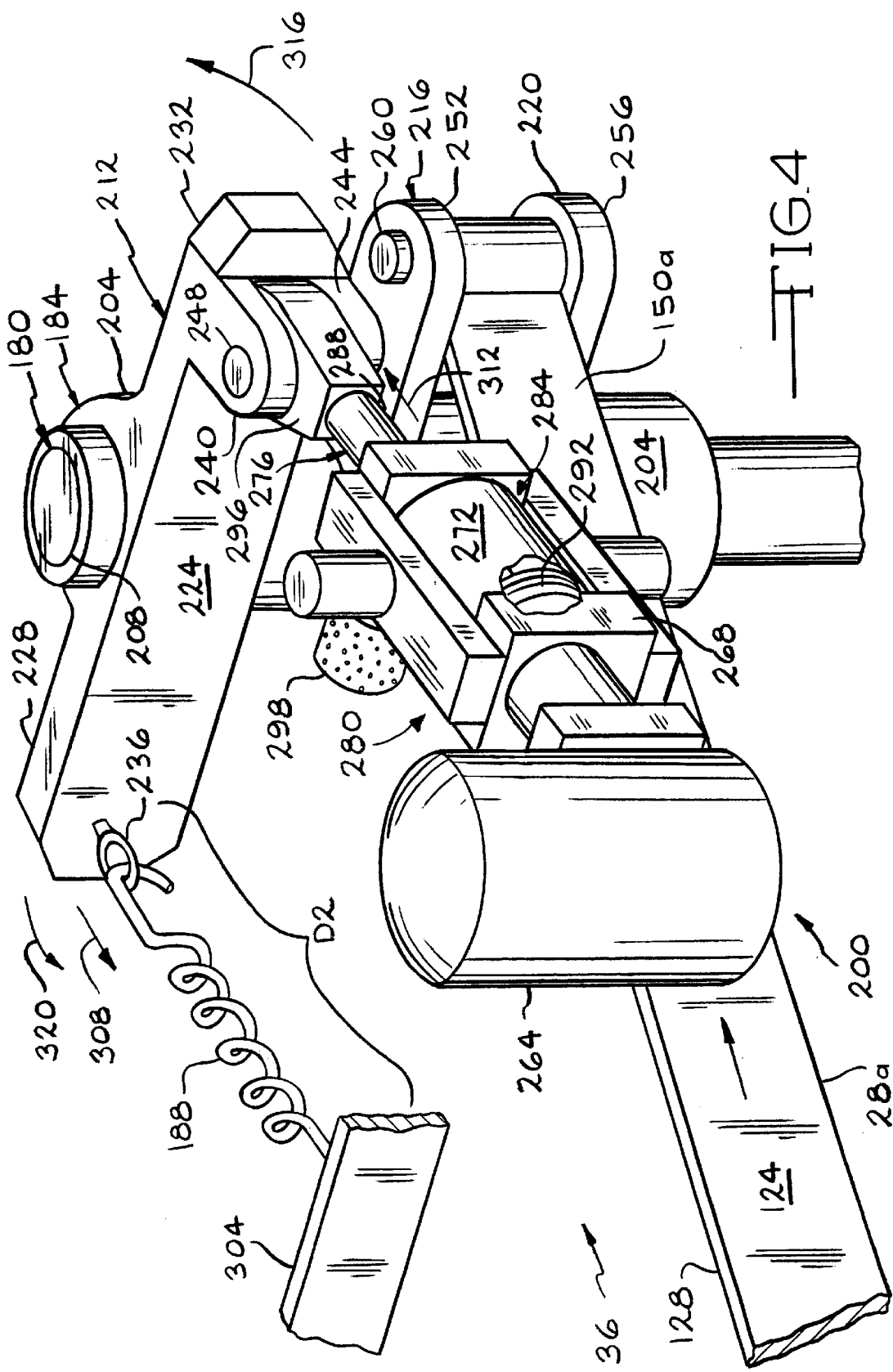
FIG. 4 is perspective view of an actuator of the braking system of FIG. 1.

Referring now to FIG. 4, the illustrated actuator 36 includes a post support 180 which pivotally supports an actuator support 184, a spring 188 operatively connected to the actuator support 184, and an actuator circuit 200 operatively connected to the actuator support 184. The illustrated actuator support 184 includes a generally cylindrical portion 204 and an upper end 208 and a lower end (not shown). The cylindrical portion 204 is provided with an opening for receiving the post support 180. The actuator support 184 preferably pivots about the post support 180 as described herein during braking. The lower end of the post support 180 illustrated is preferably fixed to the floor surface 72 by suitable means. The post support 180 is spaced apart from the post 68 of the band support 40.

The actuator support 184 includes an upper arm 212 a middle arm 216 and a lower arm 220. The upper arm 212, the middle arm 216, and the lower arm 220 extend from the cylindrical portion 204. The upper arm 212 includes a generally flat inner wall 224, a spring end 228, and an actuator circuit end 232. The inner wall 224 supports a ring 236 extending therefrom. The ring 236 is operatively connected to the spring 188. At rest, the spring 188 has a length D2.

The illustrated actuator circuit end 232 of the upper arm 212 supports an upper flange 240 and a lower flange 244 spaced apart from and generally parallel to the upper flange 240. The upper flange 240 and the lower flange 244 have aligned apertures formed therein which receive a suitable fastener 248 thereby operatively connecting the actuator circuit end 232 of the upper arm 212 of the actuator support 184 to the actuator circuit 200.

The illustrated middle arm 216 is provided below the upper arm 212 at the actuator circuit end 232. The illustrated middle arm 216 includes an end 252. The illustrated lower arm 220 is provided below the middle arm 216. The illustrated lower arm 220 includes an end 256. The middle arm 216 and the lower arm 220 are spaced apart from and generally parallel to each other. The end 252 of the middle arm 216 and the rounded end 256 of the lower arm 220 cooperate to receive a suitable extension 260 therebetween. The extension 260 is preferably cylindrical. The extension 260 is secured to the brake band 28 to operatively connect the control end 150 of the brake band 28 to the actuator support 184. To accomplish this, a suitable fastener extends through aligned apertures formed in the middle arm 216, the extension 260, and the lower arm 220. The brake band 28 is preferably spaced apart from the cylindrical portion 204 of the actuator support 184.

The illustrated actuator circuit 200 is an air circuit and includes an accumulator 264, a valve 268 between the accumulator 264 and a cylinder 272, and a piston 276 operatively connecting the cylinder 272 to the end 232 of the upper arm 212 of the actuator support 184. The air circuit 200 is adaptable to handle air as well as non-air fluids, such as for example hydraulic fluid, to provide the actuator 36 a functionality similar to that described herein. Alternatively, the actuator 36 can be other than illustrated if desired.

The illustrated accumulator 264 is in fluid communication with the cylinder 272 at a blind end 280 of the cylinder 272. The accumulator 264 stores a fluid, such as for example air or hydraulic fluid, under pressure. The accumulator 264 may employ a spring, lever, or other components as necessary to allow the fluid to be stored under pressure. The valve 268 is adapted to regulate a flow of the fluid from the accumulator 264 to the blind end 280 of the cylinder 272.

The illustrated cylinder 272 is generally cylindrical and adapted to support the piston 276 for movement therein. The illustrated cylinder 272 includes a shaft end 284. The shaft end 284 has an opening in it to support a shaft 288 of the piston 276. The illustrated piston 276 also includes a generally rounded head 292. The head 292 of the piston 276 is fixed to the shaft 288 thereof. The illustrated shaft 288 of the piston 276 includes a connector 296 at the end of the piston 276 opposite the head 292. The fastener 248 extends through apertures provided in the flange 240 and the connector 296 to operatively connect the piston 276 to the upper arm 212. An exhaust valve 298 is preferably provided for the air circuit 200 at the shaft end 284 of the cylinder 272 for a purpose to be described herein.

The illustrated actuator 36 further includes two support posts 300 (illustrated in FIG. 1). The illustrated support posts 300 are fixed to the floor surface 72. The support posts 300 are spaced apart from the post 68 of the band support 40 and the post support 180 of the actuator 36. The support posts 300 illustrated are operative to support the actuator 36 in a spaced-apart relationship with the floor surface 72. The illustrated support posts 300 are rigidly fixed to a support plate 304. The support plate 304 is operatively connected to the spring 188 for a purpose to be described herein.

The operation of the brake system 24 during braking will now be discussed in further detail. As discussed above, braking includes those instances in which it is desirable to decelerate the rotation of the turntable 10 quickly, and those instances in which it is desirable to completely stop the rotation of the turntable 10. Braking may be initiated by activating a "stop" button, switch, or any other suitable means. Braking may also be initiated by sensing the presence of a person or other valuable entity at an unauthorized point with respect to the turntable 10. Braking results in a number of changes in the brake system 24, including movement of the components as described herein. It should be noted that the changes described need not occur in the order described. Indeed, the components may begin movement, continue movement, or cease movement in any suitable sequence or time frame as desired.

Referring now to FIG. 2, during braking, the braking assembly 82 moves radially inwardly in the direction indicated by the arrow 100. The radially inwardly movement of the braking assembly 82 is facilitated by the bearing 84, which likewise supports a radially inwardly movement of the guide rod 88 toward the brake drum 32. The support plate 104 is operatively connected to the guide rod 88, and is likewise urged radially inwardly toward the brake drum 32. The brake bands 28a, 28b are similarly urged radially inwardly toward the brake drum 32, as are the brake pads 132a, 132b attached thereto. When the brake pads 132a, 132b are employed, they preferably contact the brake drum 32 during braking. More preferably, the inner surfaces 13a, 136b of the brake pads 132a, 132b along the contact surfaces 156 and 157 engage the brake drum 32.

The operation of the brake system 24 during braking will now be discussed further in reference to FIG. 3. The upper brake band 28a and the lower brake band 28b desirably move during braking. The upper brake band 28a is pulled or moved by the actuator 36 as described herein, and preferably moves in the direction indicated by the arrow 160. Likewise, the lower brake band 28b is pulled or moved by the actuator 36 as described herein, and preferably moves in the direction indicated by the arrow 164. When the upper brake band 28a and the lower brake band 28b are not being pulled, adjacent surfaces thereof are separated by a distance D1. During braking, the distance D1 decreases as the upper brake band 28a and the lower brake band 28b move closer together. During braking, the upper brake band 28a desirably moves in a generally clockwise direction indicated by the arrow 168. During braking the lower brake band 28b desirably moves in a counterclockwise direction indicated by the arrow 172. In the illustrated embodiment, the brake bands 28a, 28b are pivotally mounted to move toward each other when the actuator 36 is operative to pull the respective control ends 150a, 150b of the brake bands 28a, 28b.

Braking preferably results in the spring 188 contracting, as indicated by the arrow 308. The length D2 of the spring 188 illustrated decreases as the spring 188 contracts. The support plate 304 fixed to the support post 300 is a relatively stationary support to allow the spring 188 to contract. As the spring 188 contracts, the spring 188 exerts a force to pull on the ring 236 extending from the spring end 228 of the upper arm 212 of the actuator support 184. The spring 188 thus pulls on the spring end 228 of the upper arm 212 of the actuator support 184, and thereby contributes to the actuator support 184 rotating about the post support 180.

In the illustrated embodiment, the air circuit 200 is also activated during braking. The accumulator 264 illustrated releases the fluid, such as air, stored therein through the valve 268 into the blind end 280 of the cylinder 272. The fluid from the accumulator 264 contacts the piston 276, preferably at the head 292 thereof. The head 292 of the piston 276 is preferably proximate the blind end 280 of the cylinder 272 at the initiation of the braking. The head 292 of the piston 276 is urged by the fluid toward the shaft end 284 of the cylinder 272. As the piston 276 moves, any fluid, including air, that may be in the cylinder 272 at the shaft end 284 is forced out of the cylinder 272 by the head 292 of the piston 276. The exhaust valve 298 allows the fluid at the shaft end 284 of the cylinder 272 to be quickly evacuated from the cylinder 272 by the head 292 of the piston 276. Thus, it can be understood that the exhaust valve 298 allows for a more rapid movement of the piston 276 through the cylinder 272. Alternatively, the spring 188 can be eliminated and only the air circuit 200 provided to effectuate movement of the brake bands 28a and 28b; however, it is desirable to also provide the spring 188 in case of failure of the air circuit 200. Thus, it is understood that either the air circuit 200 itself, the spring 188 itself, or the combination of the spring 188 and the air circuit 200 can be used to effectuate movement of the brake bands 28a and 28b relative to the brake drum 32.

During braking, the piston 276 moves in the direction indicated by the arrow 312 (shown in FIG. 4). The shaft 288 of the piston 276 urges the air circuit end 232 of the upper arm 212 of the actuator support 184 to rotate about the post support 180. Thus, it can be seen that the spring 188 and the air circuit 200 preferably cooperate to rotate the actuator support 184 about the post support 180 in the general directions indicated by the respective arrows 320 and 316.

During braking, the control end 150a of the upper brake band 28a likewise rotates in the general direction indicated by the arrow 320. Thus, braking results in the rotation of the middle arm 216 and the lower arm 220 of the actuator support 184, which in turn supports the control end 150a of the upper brake band 28a being pulled substantially taut. This allows the upper brake band 28a to engage the brake drum 32 as described herein. When more than one actuator 36 is employed, each actuator 36 is preferably operatively connected to a separate brake band. Each actuator 36 is preferably actuated simultaneously with each other actuator. Thus, simultaneous actuator 36 movement allows each of the associated brake bands 28a and 28b to the engage the brake drum 32 at about the same time with each of the other brake bands 28a and 28b.

The brake system 24 is easily adaptable any may be constructed and used in a number of suitable alternate embodiments. For example, any suitable number of actuators 36 may be employed. The actuators 36 are preferably equally spaced circumferentially apart from each other. When two actuators 36 are employed, they are preferably spaced apart from each other by about 180 degrees. When four actuators 36 are employed, they are preferably spaced apart from each other by about 90 degrees. Each of the actuators 36 can employ more than one brake band, and can allow the brake bands to be operatively connected to the associated actuator at any suitable location thereon.

The actuator 36 can also include only one arm that pivots about the pivot point of the actuator 36. When a one-arm actuator 36 is employed, the arm may be positioned similarly to the spring end 228 of the upper arm 212 of the actuator support 184. The spring 188, the air circuit 200 or any other suitable pivoting means may be employed to pivot the actuator support 184 about the post support 180. In such a configuration of the brake system 24, the brake bands 28a, 28b can be operatively connected to the actuator 36 at any suitable location thereon.

In accordance with the provisions of the patent statutes, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A brake system adapted for use with a rotary turntable comprising:

a braking member secured to the rotary turntable, said braking member having a generally annular shape and including a generally annular outer braking surface;

at least one brake band having a generally annular shape and including a generally annular outer friction surface disposed adjacent said annular outer braking surface of said braking member, said brake band movable between a first non-braking position, wherein said friction surface of said brake band is spaced apart from said braking surface of said braking member, and a second braking position, wherein said friction surface of said brake band contacts at least a portion of said braking surface of said braking member, said brake band including a first end and an opposite second end, said first end secured to a stationary anchor member;

an actuator operatively connected to said second end of said brake band for selectively moving said brake band between said braking position and said non-braking position; and at least one support member disposed between said ends of said brake band for slidably supporting said brake band relative to said braking member, said support member including a first member secured to a fixed surface and a moveable second member having a first end and a second end, said first member including a bearing member, said first end of said second member freely slidably disposed in said bearing member of said first member, and said second end of said second member coupled to said brake band for movement therewith.

2. The brake system according to claim 1 wherein said friction surface of said brake band contacts said braking surface of said braking surface of said braking member at an annular contact surface of at least 180 degrees.

3. The brake system according to claim 1 wherein said friction surface of said brake band contacts said braking surface of said braking surface of said braking member at an annular contact surface of about 300 degrees.

4. The brake system according to claim 1 wherein said braking member includes a plurality of individual segments which are connected together to define is a generally continuous braking member.

5. The brake system according to claim 1 wherein a plurality of said support members are provided for slidably supporting said brake band relative to said braking member.

6. The brake system according to claim 1 wherein said actuator includes a fixed support post and at least one arm pivotally supported relative thereto, said one arm operatively connected to said second end of said brake band.

7. The brake system according to claim 6 wherein said actuator is a pneumatically operated actuator.

8. The brake system according to claim 6 wherein said actuator is a spring biased actuator.

9. The brake system according to claim 6 wherein said actuator is a combination pneumatically operated and spring biased actuator.

10. The brake system according to claim 1 wherein said brake system includes a pair of brake bands separately connected to a respective actuator.

11. The brake system according to claim 10 wherein one of said brake bands is operative to apply a first braking force to said braking member in a first circumferential direction and the other one of said brake bands is operative to apply a second braking force to said braking member in a second opposite circumferential direction.

12. A brake system adapted for use with a rotary turntable comprising:

a braking member secured to the rotary turntable, said braking member having a generally annular shape and including a generally annular outer braking surface;

a pair of brake bands each having a generally annular shape and including a generally annular outer friction surface disposed adjacent said annular outer braking surface of said braking member, said pair of brake bands movable between a first non-braking position, wherein said friction surface of said brake bands is spaced apart from said braking surface of said braking member, and a second braking position, wherein said friction surface of said pair of brake bands contacts said braking surface of said braking surface of said braking member at an annular contact surface of at least 180 degrees, each of said brake bands including a first end and an opposite second end, said first end secured to a stationary anchor member;

a pair of actuators operatively connected to said second ends of said brake bands for selectively moving each of said brake bands between said braking position and said non-braking position; and at least one support member disposed between said ends of said brake bands for slidably supporting said brake bands relative to said braking member, said support member including a first member secured to a fixed surface and a moveable second member having a first end and a second end, said first member including a bearing member, said first end of said second member freely slidably disposed in said bearing member of said first member, and said second end of said second member coupled to said brake bands for movement therewith;

wherein one of said pair of brake bands is operative to apply a first braking force to said braking member in a first circumferential direction and the other one of said pair of brake bands is operative to apply a second braking force to said braking member in a second opposite circumferential direction.

13. The brake system according to claim 12 wherein said friction surface of each of said pair of brake bands contacts said braking surface of said braking surface of said braking member at an annular contact surface of about 300 degrees.

14. The brake system according to claim 12 wherein said braking member includes a plurality of individual segments which are connected together to define a generally continuous braking member.

15. The brake system according to claim 12 wherein each of said pair of actuators includes a fixed support post and at least one arm pivotally supported relative thereto, said one arm operatively connected to said second end of each of said pair of brake bands.

16. The brake system according to claim 15 wherein each of said pair of actuators is a pneumatically operated actuator.

17. The brake system according to claim 15 wherein each of said pair of actuators is a spring biased actuator.

18. The brake system according to claim 15 wherein each of said pair of actuators is a combination pneumatically operated and spring biased actuator.

* * * * *